US007742895B2

United States Patent
Seko et al.

(10) Patent No.: US 7,742,895 B2
(45) Date of Patent: Jun. 22, 2010

(54) POSITION MEASUREMENT SYSTEM, POSITION MEASUREMENT METHOD AND COMPUTER READABLE MEDIUM

(75) Inventors: Yasuji Seko, Ashigarakami-gun (JP); Hiroyuki Hotta, Ashigarakami-gun (JP); Yasuyuki Saguchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/099,576

(22) Filed: Apr. 8, 2008

(65) Prior Publication Data

US 2009/0070065 A1   Mar. 12, 2009

(30) Foreign Application Priority Data

Sep. 12, 2007   (JP) ............................. 2007-237124

(51) Int. Cl.
  *G01C 9/00* (2006.01)
(52) U.S. Cl. ...................................................... 702/152
(58) Field of Classification Search ................. 702/152
  See application file for complete search history.

(56) References Cited

U.S. PATENT DOCUMENTS

| 5,227,985 A | | 7/1993 | DeMenthon |
| 5,297,061 A | | 3/1994 | Dementhon et al. |
| 5,767,960 A | * | 6/1998 | Orman ................... 356/139.03 |
| 6,339,683 B1 | * | 1/2002 | Nakayama et al. .......... 396/429 |

FOREIGN PATENT DOCUMENTS

| JP | 02-183103 | | 7/1990 |
| JP | 04-370704 | | 12/1992 |
| JP | 05-133715 | A | 5/1993 |
| JP | 07-281814 | A | 10/1995 |
| JP | 08-105720 | A | 4/1996 |
| JP | 09-166411 | A | 6/1997 |
| JP | 09-243325 | A | 9/1997 |
| JP | 11-143629 | A | 5/1999 |
| JP | 2001-194141 | A | 7/2001 |
| JP | 2003-130621 | A | 5/2003 |

OTHER PUBLICATIONS

English-language translation of Japanese Office Action dated Jan. 19, 2010 for Japanese Application No. 2007-237124.

* cited by examiner

*Primary Examiner*—Aditya Bhat
(74) *Attorney, Agent, or Firm*—Sughrue Mion, PLLC

(57) ABSTRACT

The position measurement system includes: an image capturing unit capturing first reference points which are three reference points on a plane arranged on a target and whose positional relation with each other is specified, and a second reference point which is a single reference point at a distance away from the plane and whose positional relation with the first reference points is specified; an identifying unit identifying images of the first and second reference points based on the positional relation among the images; and a calculating unit calculating a three-dimensional position and triaxial angles of the target based on the positional relation between the images of the first and second reference points. The calculating unit specifies the plane including the first reference points on the target from the images of the first reference points and a normal direction of the plane according to the image of the second reference point.

13 Claims, 10 Drawing Sheets

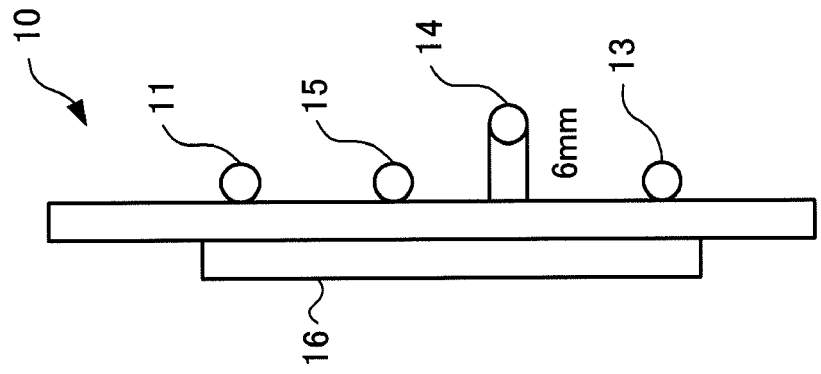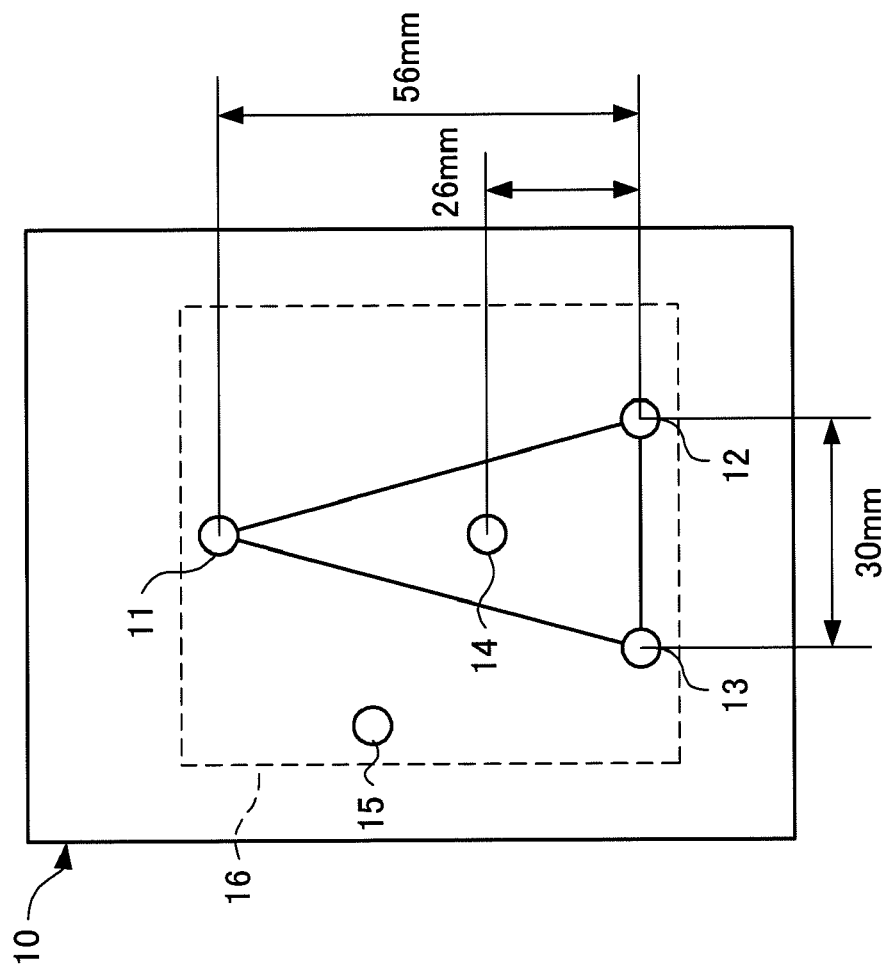

POSITION MEASUREMENT SYSTEM, POSITION MEASUREMENT METHOD AND COMPUTER READABLE MEDIUM

CROSS REFERENCE TO RELATED APPLICATIONS

This application is based on and claims priority under 35 USC §119 from Japanese Patent Application No. 2007-237124 filed Sep. 12, 2007.

BACKGROUND

1. Technical Field

The present invention relates to a position measurement system in which a position and an angle of a target in three dimensions (a direction of the target and the like) are measured in a simple method, a position measurement method and a computer readable medium storing a program.

2. Related Art

As a unit that measures a three-dimensional position of a predetermined target, a method of calculating a positional coordinates of the target by capturing the target with two cameras and by triangulating with a distance between the cameras as a base line is often used. When a positional relation among 6 points arranged in a three-dimensional space is known in advance, a position of the target in the three-dimensional space formed by the 6 points (hereinafter, referred to as a three-dimensional position) and angles (roll angle, pitch angle, and yaw angle; hereinafter referred to as triaxial angles) may be calculated from an image obtained by capturing these points by a camera.

SUMMARY

According to an aspect of the invention, there is provided a position measurement system including: an image capturing unit that captures first reference points which are three reference points on a plane arranged on a target and whose positional relation with each other is specified, and a second reference point which is a single reference point at a given distance away from the plane and whose positional relation with the first reference points is specified; an identifying unit that identifies images of the first reference points and an image of the second reference point on the basis of the positional relation among the images of the four reference points captured by the image capturing unit; and a calculating unit that calculates a three-dimensional position and triaxial angles of the target on the basis of the positional relation between the images of the first reference points and the image of the second reference point identified by the identifying unit. The calculating unit specifies the plane including the first reference points on the target from the images of the first reference points identified by the identifying unit and specifies a normal direction of the plane according to the image of the second reference point identified by the identifying unit.

BRIEF DESCRIPTION OF THE DRAWINGS

Exemplary embodiment(s) of the present invention will be described in detail based on the following figures, wherein:

FIGS. 2A and 2B are diagrams illustrating a configuration of the target;

DETAILED DESCRIPTION

An exemplary embodiment of the present invention will be described below in detail referring to the attached drawings.

<System Configuration>

Figure 1:
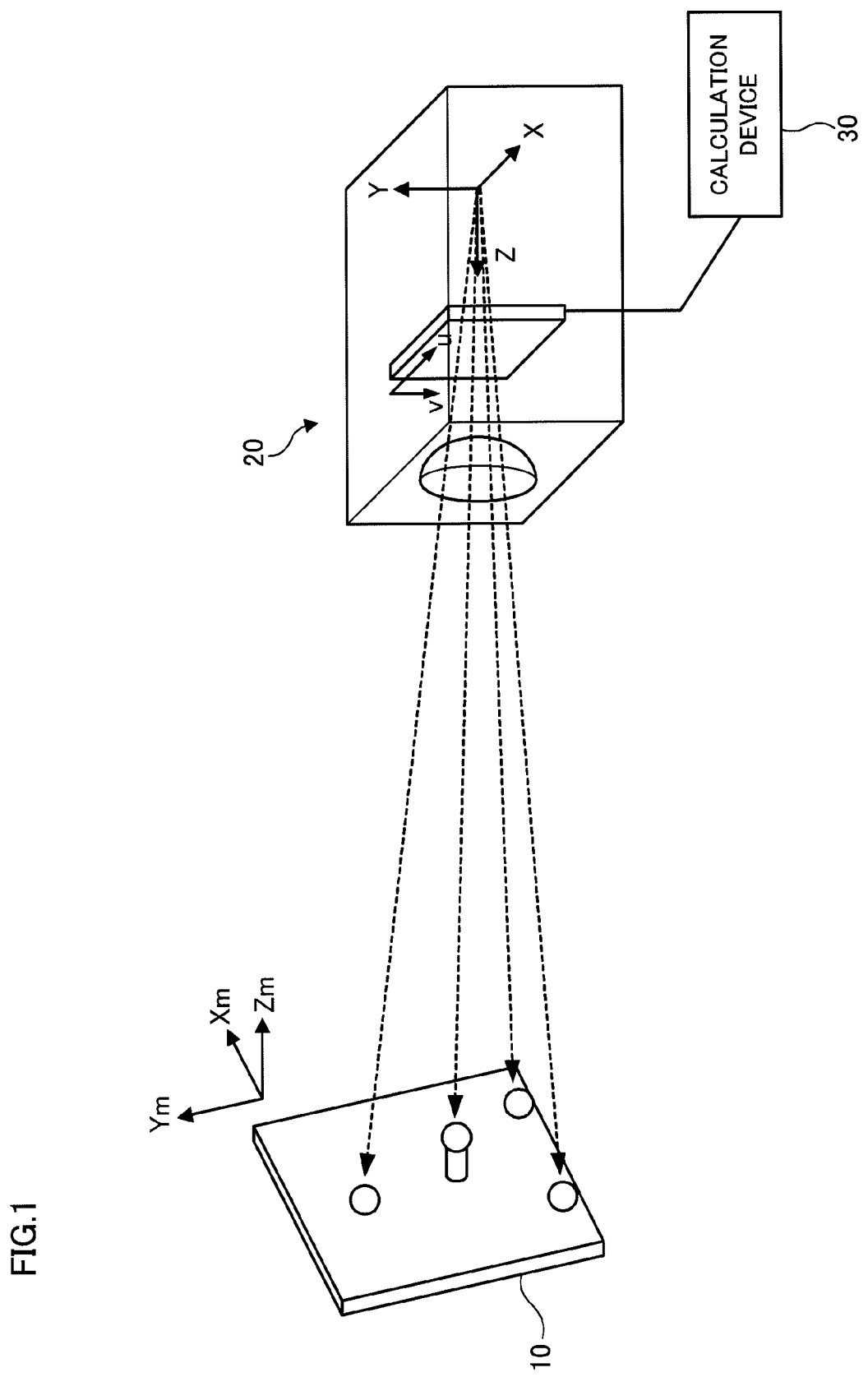
FIG. 1 is a diagram illustrating an entire configuration of a position measuring system to which the exemplary embodiment is applied.

FIG. 1 is a diagram illustrating an entire configuration of a position measuring system to which the exemplary embodiment is applied.

The position measuring system of the present exemplary embodiment includes, as shown in FIG. 1, a target 10 to be captured, a camera 20 for capturing the target 10, and a calculation device 30 that calculates a three-dimensional position and triaxial angles of the target 10 based on an image captured by the camera 20.

FIGS. 2A and 2B are diagrams illustrating a configuration of the target 10.

As shown in FIGS. 2A and 2B, the target 10 is provided with reference markers 11 to 14 used for calculating the three-dimensional position and the triaxial angles of the target 10 and a code marker 15 used for adding predetermined information. The reference markers 11 to 14 and the code marker 15 have their positional relation to each other defined in advance and are configured by an LED. The target 10 is provided with a light emission controlling apparatus 16 that controls light emission of the LED.

The reference markers 11 to 14 include three reference markers 11 to 13 on the same plane and one reference marker 14 located at a certain height from the plane. Hereinafter, if the former three markers should be discriminated from the latter one marker, the formers are referred to as first reference markers 11 to 13 and the latter as the second reference marker 14. The first reference markers 11 to 13 are provided on the surface of the target 10. The second reference marker 14 is provided at a distal end of a leg provided near the center of gravity of a triangle formed by the first reference markers 11 to 13.

The shape of the triangle formed by the first reference markers 11 to 13 is not particularly limited but it may be an isosceles triangle. In an example shown in FIG. 2A, the base of the isosceles triangle is 30 mm and a height is 56 mm. The second reference marker 14 is provided at the distal end of the leg with a length of 6 mm provided at a position of 26 mm from a median of the base.

The length of the leg where the second reference marker 14 is provided is arbitrary but selected on a condition that even if the target 10 is inclined with respect to an image capturing face of the camera 20, a marker image of the second reference marker 14 (an image of the marker captured by the camera 20, hereinafter the same applies to the other markers) should keep a position closest to the center of gravity of the triangle formed by marker images of the first reference markers 11 to 13. Therefore, in actual use, it may be determined according to how much the target 10 may be inclined with respect to the image capturing face of the camera 20.

Moreover, a position of the leg where the second reference marker 14 is provided is described as near the center of gravity of the triangle formed by the first reference markers 11 to 13 but not necessarily limited to that. Actually, the position may be determined such that, even if the target 10 is inclined with respect to the image capturing face of the camera 20, the marker image of the second reference marker 14 is at a position closest to the center of gravity of the triangle formed by the marker images of the first reference markers 11 to 13 among the marker images of the reference markers 11 to 14. To be strict, the relation with the length of the leg where the second reference marker 14 is provided should be considered, but when the length of the leg is sufficiently short, even if the target 10 is inclined with respect to the image capturing face of the camera 20, the marker image of the second reference marker 14 is not moved largely. Therefore, in practice, it is only necessary that the second reference marker 14 is arranged at a position closest to the center of gravity of the triangle formed by the first reference markers 11 to 13.

The code marker 15 is provided on the same plane as the first reference markers 11 to 13 (surface of the target 10) and outside the triangle formed by the first reference markers 11 to 13. The position of the code marker 15 is specified by a relation with the first reference markers 11 to 13 and has some choices. The details will be described later. Further, the code marker 15 is given arbitrary roles depending on the use of the device which is the target 10. For example, indication of on or off of a switch, click of a mouse and the like of the device which is the target 10 is represented by flashing of the code marker 15.

FIGS. 1, 2A and 2B describe the target on a card on which the reference markers 11 to 14 and the code marker 15 are provided as the target 10. However, in the present exemplary embodiment, since the three-dimensional position and the triaxial angles of the target 10 are calculated based on the marker images of the reference markers 11 to 14 captured by the camera 20, while the reference markers 11 to 14 and the code marker 15 form the above positional relation, the shape of the target 10 itself is not limited at all. Also, while the second reference marker 14 is arranged at a certain height with respect to the plane including the first reference markers 11 to 13, the leg shown in FIG. 2B may not be provided in the arrangement. For example, if the surface of the target 10 has a shape raised in the projecting state with respect to the plane including the first reference markers 11 to 13, the second reference marker 14 may be arranged directly on the surface of the target 10.

Figure 3:
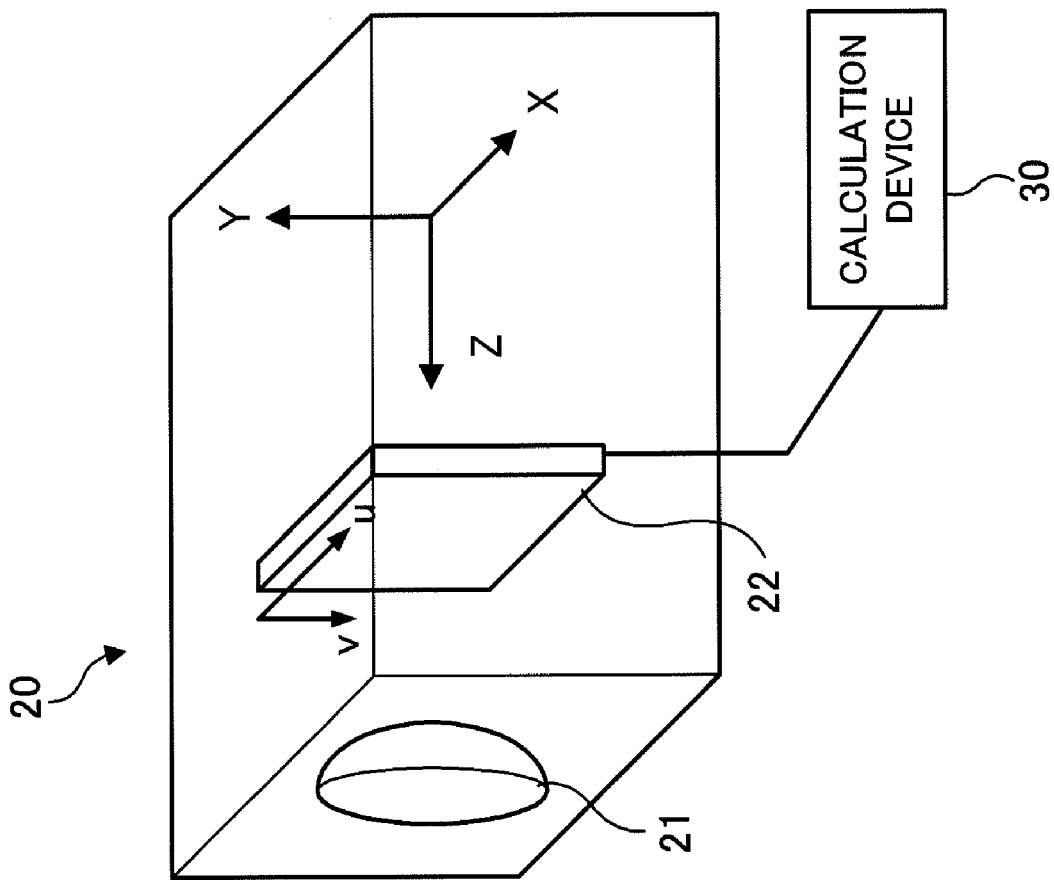
FIG. 3 is a diagram illustrating a configuration example of the camera.

FIG. 3 is a diagram illustrating a configuration example of the camera 20.

The camera 20 is provided with an optical system 21 converging light emitted from the reference markers 11 to 14 and the code marker 15, and an image sensor 22 which is an image capturing unit that detects the light converged by the optical system 21.

The optical system 21 is constituted by a single lens or a combination of plural lenses. Various aberrations may be appropriately removed by combination of lenses, coating applied on the lens surface, and the like.

The image sensor 22 is constituted by arranging image capturing elements such as a CCD (Charge Coupled Device), a CMOS (Complementary Metal Oxide Semiconductor) and the like. The surface of the image sensor 22 is the image capturing face of the camera 20. By installing a filter according to a light emitting wavelength of the LED used in the reference markers 11 to 14 and the code marker 15 on the front face of the image sensor 22, extra light is eliminated and only the reference markers 11 to 14 and the code marker 15 are captured. Specifically, if the light emitting wavelength of the LED used in the reference markers 11 to 14 and the code marker 15 is 900 nm for example, a filter transmitting only a wavelength longer than 850 nm is installed on the front face of the image sensor 22.

The calculation device 30 is realized by a personal computer or the like, for example. The calculation device 30 acquires image data of a marker image captured by the image sensor 22 of the camera 20 and calculates three-dimensional positions of the reference markers 11 to 14 and the code marker 15 corresponding to the respective marker images. The calculation device 30 identifies each marker image so as to correspond to one of the markers based on the calculated three-dimensional position of each marker. Since there are three first reference markers 11 to 13, when the positions of the first reference markers 11 to 13 are specified by the marker images of the identified first reference markers 11 to 13, a plane on which the first reference markers 11 to 13 of the target 10 are arranged is specified. However, the plane including the first reference markers 11 to 13 is not uniquely specified only from the marker images of the first reference markers 11 to 13 projected onto the image capturing face (two dimensions) of the camera 20. That is, even if an angle of the plane to the image capturing face is different, the marker images of the first reference markers 11 to 13 may be the same in some cases. On the contrary, the direction of the plane including the first reference markers 11 to 13 (normal direction of the plane) is specified by the position of the marker image of the identified second reference marker 14. That is, by the marker images of the first reference markers 11 to 13 and the second reference marker 14, the plane including the first reference markers 11 to 13 is uniquely specified. From the information, the calculation device 30 calculates the three-dimensional position and the triaxial angles of the target 10 based on the three-dimensional position and the identification result.

<Calculation of the Three-Dimensional Position and the Triaxial Angles of the Target 10>

Next, a method of calculating the three-dimensional position and the triaxial angles of the target 10 based on the positions of the reference markers 11 to 14 will be described. The description will be made here supposing that the reference markers 11 to 14 and the code marker 15 have been already identified, but the identification method will be described later.

Figure 4:
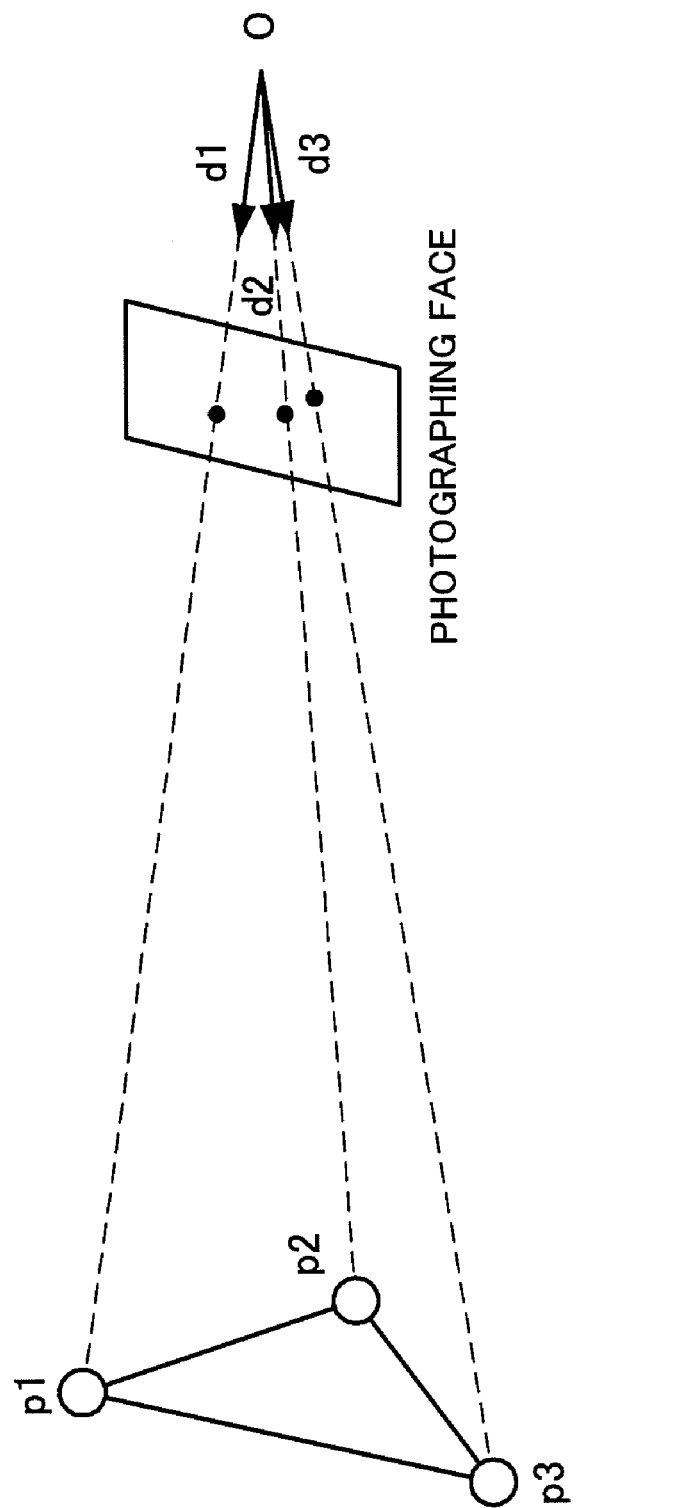
FIG. 4 is a diagram for explaining the method of calculating the three-dimensional position and the triaxial angles of the target.

FIG. 4 is a diagram for explaining the method of calculating the three-dimensional position and the triaxial angles of the target 10.

An image captured by the camera 20 is a perspective projection model. First, as shown in FIG. 4, a direction di (i=1, 2, 3) to each of the first reference markers 11 to 13 from an optical center O of the camera 20 is calculated based on the marker images of the first reference markers 11 to 13 on the image (on the image sensor 22) captured by the camera 20. The reference character di is located on a straight line connecting the respective marker images of the first reference markers 11 to 13 on the image capturing face of the camera 20 with the optical center O, and is a standardized unit vector with the optical center O as its starting point. The direction to the first reference marker 11 is a vector d1 (=[x1, y1, z1]), the direction to the first reference marker 12 is a vector d2 (=[x2, y2, z2]), and the direction to the first reference marker 13 is a vector d3 (=[x3, y3, z3]).

With the optical center O of the camera 20 as a reference, a position vector of the first reference marker 11 is p1, a position vector of the first reference marker 12 is p2, and a position vector of the first reference marker 13 is p3. These position vectors pi are overlapped with the vectors di, respectively. Then, supposing that coefficients representing the respective lengths of the position vectors pi are t1, t2 and t3, respective position vectors pi are expressed as in the following equations:

$$\begin{cases} p1 = t1 \cdot d1 \\ p2 = t2 \cdot d2 \\ p3 = t3 \cdot d3 \end{cases} \quad \text{[Equations 1]}$$

Since the shape of the triangle formed by the first reference markers 11 to 13 is known in advance, supposing that the length of each side of the triangle (length between each of the first reference markers 11 to 13) is p1p2=L1, p2p3=L2, p3p1=L3, the following equations are obtained:

$$\begin{cases} (t1x1 - t2x2)^2 + (t1y1 - t2y2)^2 + (t1z1 - t2z2)^2 = L1^2 \\ (t2x2 - t3x3)^2 + (t2y2 - t3y3)^2 + (t2z2 - t3z3)^2 = L2^2 \\ (t3x3 - t1x1)^2 + (t3y3 - t1y1)^2 + (t3z3 - t1z1)^2 = L3^2 \end{cases} \quad \text{[Equations 2]}$$

By putting them in order, the following equations are obtained:

$$\begin{cases} t1^2 - 2t1t2(x1x2 + y1y2 + z1z2) + t2^2 - L1^2 = 0 \\ t2^2 - 2t2t3(x2x3 + y2y3 + z2z3) + t3^2 - L2^2 = 0 \\ t3^2 - 2t3t1(x3x1 + y3y1 + z3z1) + t1^2 - L3^2 = 0 \end{cases} \quad \text{[Equations 3]}$$

Further, the following equations are obtained:

$$\begin{cases} t1 = A1 \cdot t2 \pm \sqrt{(A1^2 - 1) \cdot t2^2 + L1^2} \\ t2 = A2 \cdot t3 \pm \sqrt{(A2^2 - 1) \cdot t3^2 + L2^2} \\ t3 = A3 \cdot t1 \pm \sqrt{(A3^2 - 1) \cdot t1^2 + L3^2} \end{cases} \quad \text{[Equations 4]}$$

Here, the A1, A2 and A3 are expressed by the following equations, respectively.

$A1 = x1x2 + y1y2 + z1z2$ $A2 = x2x3 + y2y3 + z2z3$ $A3 = x3x1 + y3y1 + z3z1$

In order to have a real solution, the real numbers t1, t2 and t3 satisfying the conditions of the following equations are substituted in the above equations 4, and t1, t2 and t3 for the equations 4 to be true are all acquired.

$$\begin{cases} t1 \leq \sqrt{\dfrac{L3^2}{1 - A3^2}} \\ t2 \leq \sqrt{\dfrac{L1^2}{1 - A1^2}} \\ t3 \leq \sqrt{\dfrac{L2^2}{1 - A2}} \end{cases} \quad \text{[Equations 5]}$$

Usually, there are plural sets of t1, t2 and t3 for the equation 4 to be true. Therefore, based on the position of the second reference marker 14, a specific set of coefficients t1, t2 and t3 is selected from the plural sets (candidates) of t1, t2 and t3.

Specifically, sets of position vectors p1, p2 and p3 corresponding to all the calculated sets of coefficients t1, t2 and t3 are calculated respectively, and the three-dimensional position and the triaxial angles of a triangle constituted by the set of p1, p2, p3 are acquired. Then, based on the three-dimensional position and the triaxial angles of each triangle, the position of the second reference marker 14 for each triangle is calculated and set as a position vector p4. Next, a position on an image (image position) when the point of the position vector p4 is captured by the camera 20 is calculated, and the calculated value is compared with an image position of the second reference marker 14 actually captured. Then, a triangle corresponding to the position vector p4 with the smallest difference from the actual image position is extracted and the set of t1, t2 and t3 corresponding to the triangle is given as a solution.

Since the directions d1, d2 and d3 and the distances t1, t2 and t3 of the first reference markers 11 to 13 are specified as mentioned above, the three-dimensional position and the triaxial angles of the triangle formed by the first reference markers 11 to 13 (and the target 10 including the triangle) are acquired.

The calculation method of the three-dimensional position and the triaxial angles of the target 10 using the reference markers 11 to 14 is not limited to the above procedure. For example, a single solution is extracted based on the image position of the second reference marker 14 after the plural sets of t1, t2, t3 are acquired in the above procedure, but the distances t1, t2, t3 and t4 to the respective reference markers 11 to 14 may be acquired by considering the relation between the image position of each of the first reference markers 11 to 13 and the image position of the second reference marker 14 in the first place.

<Identification of the Markers in the Image>

Next, a method of identifying respective marker images of the reference markers 11 to 14 and the code marker 15 from the image captured by the camera 20 will be described.

In the present exemplary embodiment, the reference markers 11 to 14 and the code marker 15 are arranged on the target 10 so that a specific geometric characteristic is satisfied, and each of the marker images are determined to correspond to any one of the reference markers 11 to 14 and the code marker 15 based on the geometric characteristic. Here, as the geometric characteristic, a characteristic maintained before and after an affine conversion is used. The affine conversion is approximation of perspective projection conversion which is an actual camera model, and, when the target is relatively small, that makes good approximation. That is because the shape formed by each marker image captured by the camera 20 corresponds to that obtained by the affine conversion of the shape formed by the reference markers 11 to 14 and the code marker 15.

Figure 5:
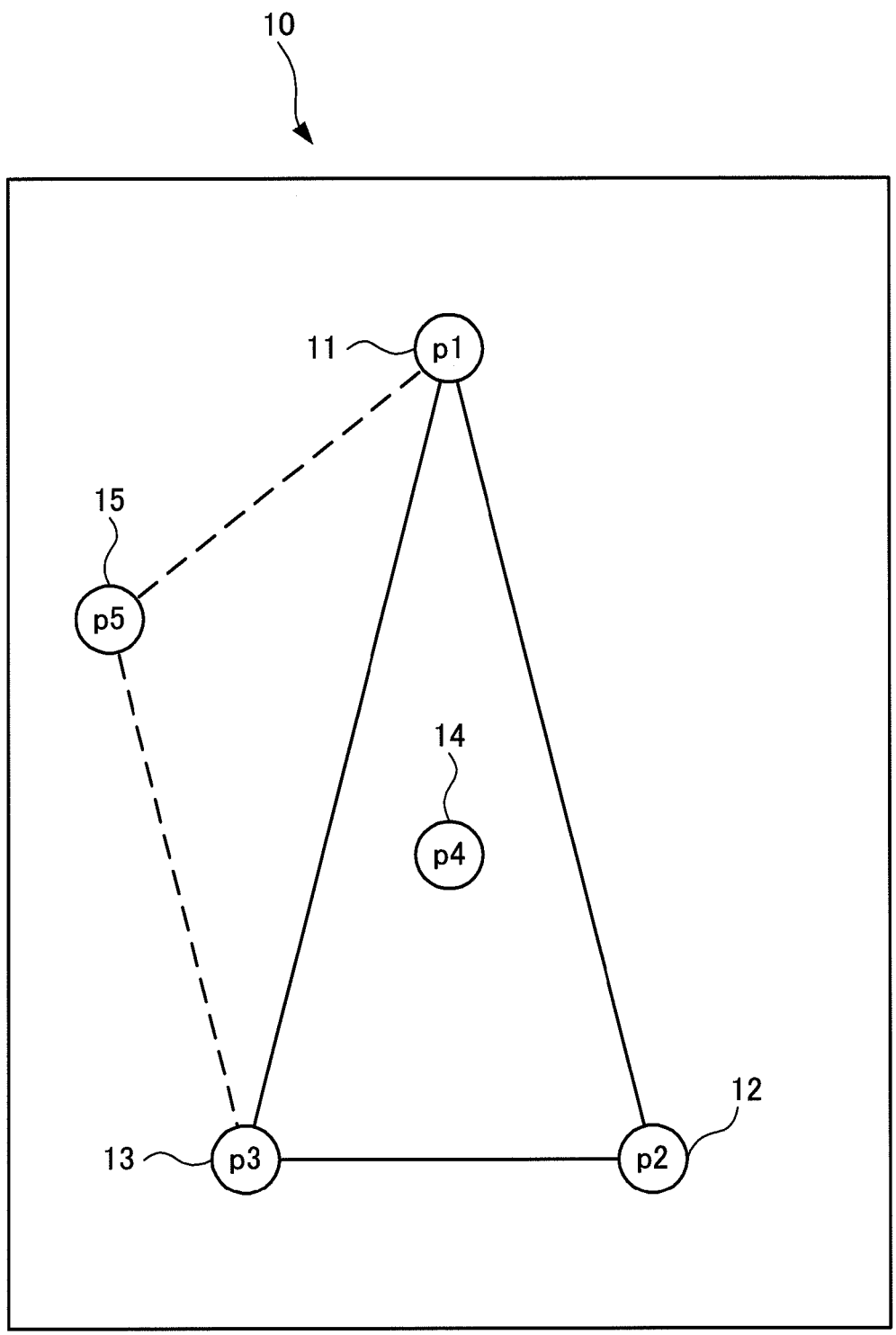
FIG. 5 is a diagram illustrating a first arrangement example of the reference markers and the code marker.

FIG. 5 is a diagram illustrating a first arrangement example of the reference markers 11 to 14 and the code marker 15.

In the example shown in FIG. 5, the first reference markers 11 to 13 form an isosceles triangle (p1p2p3), and the second reference marker 14 is arranged at the center of gravity (p4) of this isosceles triangle. The center of gravity of the triangle is a characteristic maintained before and after the affine conversion. That is, the position of the center of gravity of the triangle constituted by the first reference markers 11 to 13 arranged on the target 10 corresponds to the position of the center of gravity of the triangle after conversion if the triangle is converted by the affine conversion. The second reference marker 14 is arranged at a position higher by a certain height from the plane including the first reference markers 11 to 13 (a proximal direction on the paper face in FIG. 5, for example). However, FIG. 5 is a diagram seen from the direction perpendicular to the plane including the first reference markers 11 to 13, and the height of the second reference marker 14 is not shown.

The code marker 15 is arranged so that a line segment (p3p5) connecting one of apexes (p3) of the triangle (p1p2p3) formed by the first reference markers 11 to 13 with the code marker 15 is in parallel with a side (p1p2) held between the other two apexes of the triangle. The characteristic that the two straight lines are parallel is a characteristic maintained before and after the affine conversion. Further, in order to discriminate the line segment connecting the code marker 15 with the one apex of the triangle from the side held between the other two apexes of the triangle, the former is set shorter than the latter. Moreover, in order to identify which of the two end points of the line segment (p3p5) is the code marker 15, the code marker 15 is positioned so as to be located at the terminal end of the line segment (p3p5) when a quadrangle (p1p2p3p5) formed by the first reference marker 11 to 13 and the code marker 15 is followed clockwise.

When being arranged as described above, the geometric characteristic in the positional relation among the first reference markers 11 to 13, the second reference marker 14 and the code marker 15 is also maintained in the positional relation of the marker images on the image captured by the camera 20. Therefore, each of the marker images is specified so as to be any one of the reference markers 11 to 14 and the code marker 15 based on the geometric characteristic.

The second reference marker 14 is located not at the center of gravity of the triangle (p1p2p3) formed by the first reference markers 11 to 13 but at a position with a certain height from the center of gravity as mentioned above. Thus, to be strict, the geometric characteristic of the position of the second reference marker 14 with respect to the first reference markers 11 to 13 is not maintained at a position of the corresponding marker image. However, if a distance between the plane including the first reference markers 11 to 13 and the second reference marker 14 is sufficiently short, even if the triaxial angles of the target 10 are changed, the position of the second reference marker 14 is not separated from the center of gravity of the triangle (p1p2p3) largely. Therefore, the marker image at the position closest to the center of gravity of the triangle (p1p2p3) may be specified as the marker image of the second reference marker 14.

A method of processing when each marker image is identified from the image captured by the camera 20 is preferable to use the geometric characteristic mentioned above, but is not limited by specific processing procedures. For example, first, marker images corresponding to four apexes of a quadrangle having two parallel sides are extracted, the first reference markers 11 to 13 and the code marker 15 are identified based on the above-described geometric characteristic, and then, the second reference marker 14 may be specified. Since the second reference marker 14 is located at a position closest to the center of gravity of the triangle (p1p2p3), it is considered to be also located at a position closest to a position of the center of gravity of the quadrangle (p1p2p3p5). Therefore, a position of the center of gravity of a quadrangle formed by arbitrary four marker images is calculated and compared with a position of the other marker image. Then, the marker image with the shortest distance between the calculated position of the center of gravity and the position of the marker image is selected, and the selected marker image may be specified as the marker image of the second reference marker 14.

Figure 6B:
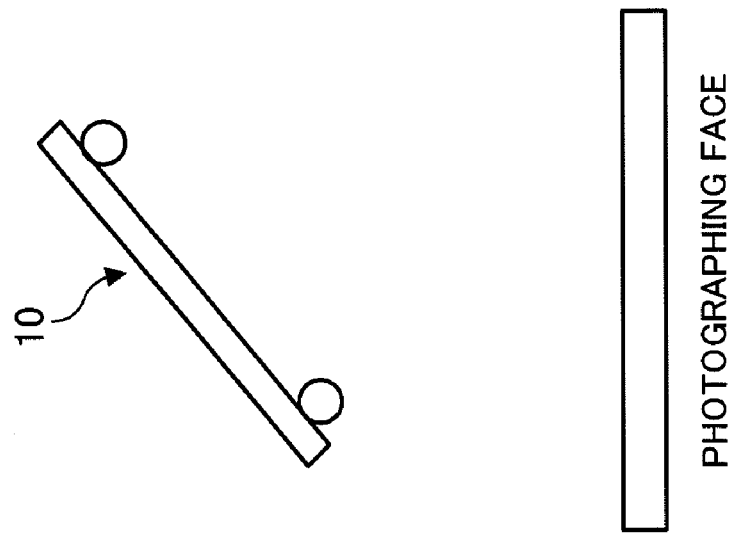
FIGS. 6A and 6B are diagrams illustrating a specific example of the first arrangement example shown in FIG. 5.
Figure 6A:
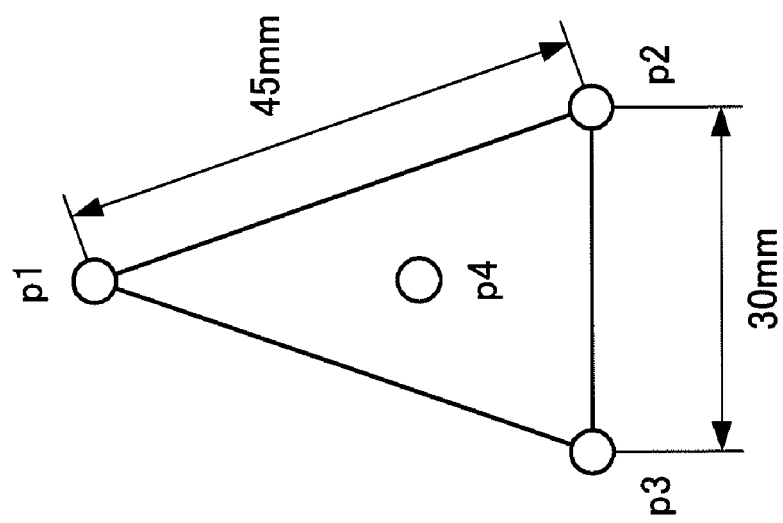

FIGS. 6A and 6B are diagrams illustrating a specific example of the first arrangement example shown in FIG. 5.

In the isosceles triangle formed by the first reference markers 11 to 13 (p1p2p3), the first reference markers 11 to 13 may be arranged so that the length of the base (p2p3) is two-thirds (⅔) or less of the length of the legs (p1p2 and p3p1) as shown in FIG. 6A. In this case, as shown in FIG. 6B, even if the triangle (p1p2p3) is inclined by 48 degrees at the largest with respect to the image capturing face of the camera 20, the base is captured as the shortest side. Therefore, the base of the triangle (p1p2p3) may be easily identified from the image captured by the camera 20 and the individual first reference markers may be specified. The angle of 48 degrees is doubled to be 96 degrees (=48×2), if the direction of inclination is considered. That is, the above-described geometric characteristic may be used for the angle change of the target 10 in a range exceeding a right angle, and that is sufficient in practice.

Figure 7:
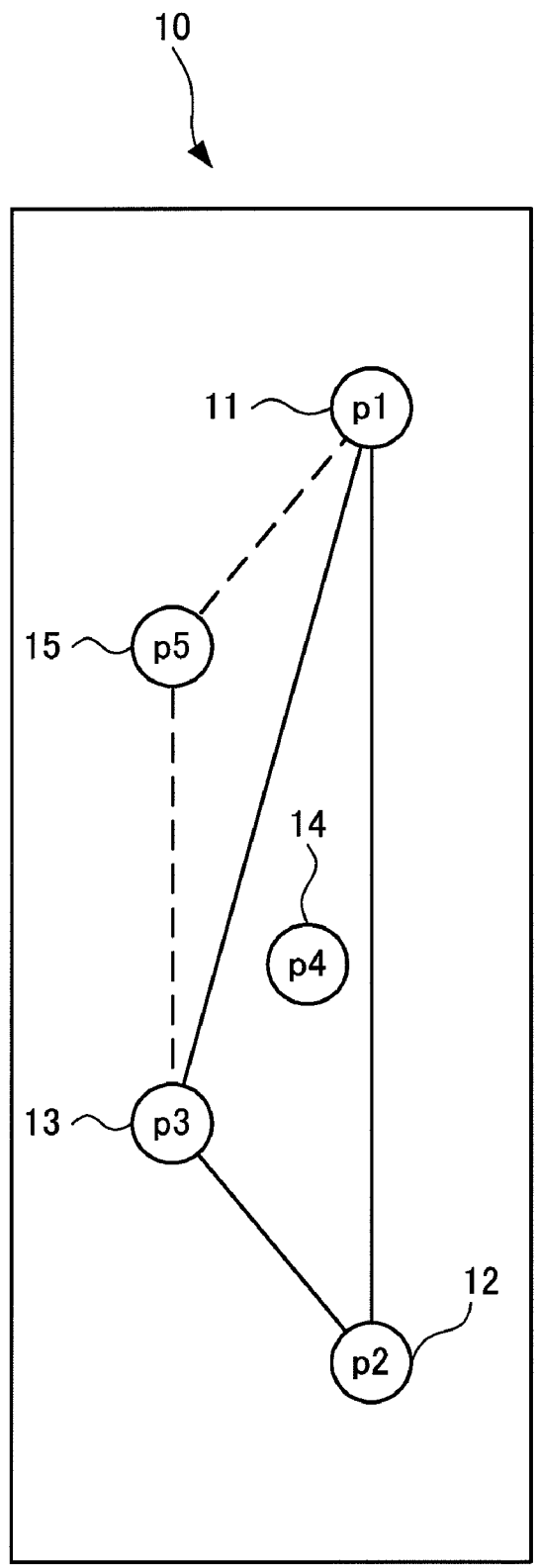
FIG. 7 is a diagram illustrating a second arrangement example of the reference markers and the code marker.

FIG. 7 is a diagram illustrating a second arrangement example of the reference markers 11 to 14 and the code marker 15.

In the first arrangement example shown in FIG. 5, the first reference markers 11 to 13 form an isosceles triangle (p1p2p3). However, the triangle (p1p2p3) may not be an isosceles triangle but may be an arbitrary triangle as shown in FIG. 7.

If the triangle formed by the first reference markers 11 to 13 is an isosceles triangle as in the first arrangement example, the center of gravity is surely located on the bisector of the base of the triangle. Thus, even if the target 10 is inclined (even if the triaxial angles are changed), the marker image of the second reference marker 14 is hardly located outside the triangle formed by the marker images of the first reference markers 11 to 13. However, this is not an essential requirement. As mentioned above, since the second reference marker 14 is located closest to the center of gravity of the triangle (p1p2p3), even if the second reference marker 14 is located outside the triangle (p1p2p3), it may be considered to be also located at a position closest to a position of the center of gravity of a pentagon (p1p2p3p4p5) formed by the reference markers 11 to 14 and the code marker 15. Then, the position of the center of gravity of the pentagon formed by the five marker images is calculated, and the marker image closest to that is specified as the marker image of the second reference marker 14.

Even if the triangle formed by the first reference markers 11 to 13 is such a general triangle, the length of the shortest side may be ⅔ or less of the lengths of other side. In this case, even if the triangle (p1p2p3) is inclined with respect to the image capturing face of the camera 20 by 48 degrees at the largest, the base is also captured as the shortest side.

Figure 8:
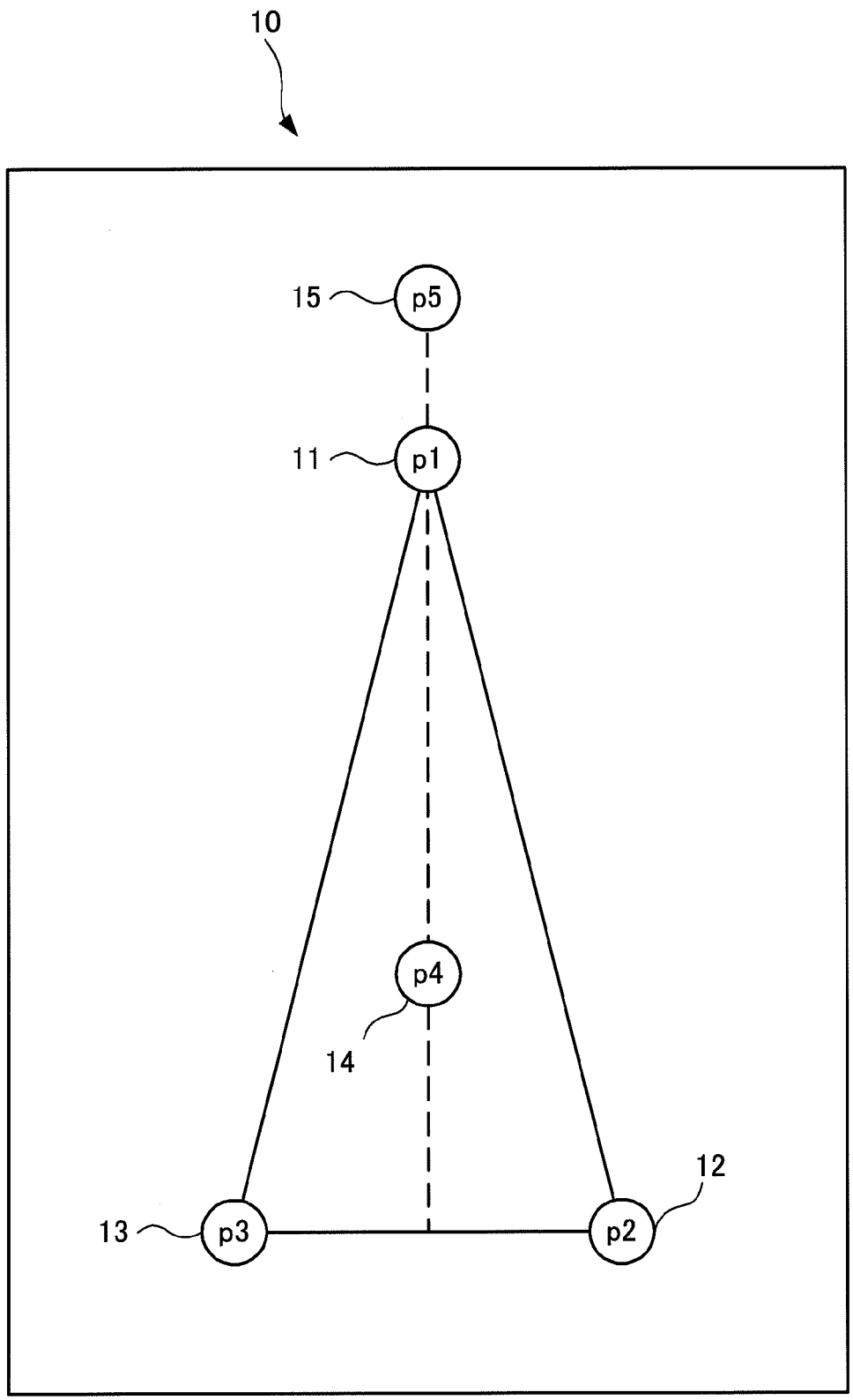
FIG. 8 is a diagram illustrating a third arrangement example of the reference markers and the code marker.

FIG. 8 is a diagram illustrating a third arrangement example of the reference markers 11 to 14 and the code marker 15.

In the third arrangement example, the code marker 15 is arranged so that it is the farthest from the center of gravity of the triangle (p1p2p3) formed by the first reference markers 11 to 13 among all the markers. Referring to FIG. 8, it is an isosceles triangle with the side (p2p3) as the base of the triangle (p1p2p3). Further, the code marker 15 is arranged outside the point (p1) on the straight line connecting the median of the base (p2p3) with the point (p1) of the apex angle. If an angle of the apex angle of the isosceles triangle is smaller than 60 degrees, the point (p1) is the farthest from the center of gravity of the triangle (p1p2p3) among the points (p1, p2, p3) corresponding to the first reference markers 11 to 13. Particularly in the isosceles triangle as in the example shown in FIG. 6, the base (p2p3) is captured as the shortest side up to the inclination of 48 degrees of the target 10 with respect to the image capturing face of the camera 20. Thus, at least up to this angle of inclination, even in the image captured by the camera 20, the point (p1) is the farthest from the center of gravity among the points (p1, p2, p3). Under the above conditions, the marker image of the code marker 15 arranged outside the point (p1) as in FIG. 8 is located at the farthest position from the center of gravity of the triangle (p1p2p3).

Therefore, each marker image is identified as follows, for example. First, among five marker images, three marker images aligned on a single straight line are extracted and the marker images on the both ends are identified as the marker images of the second reference marker 14 and the code marker 15. Further, the single marker image in the middle and the remaining two marker images are specified as the first reference markers 11 to 13, and the center of gravity is calculated. Then, the one closer to the center of gravity may be specified as the marker image of the second reference marker 14 and the farther one as the code marker 15.

If the point (p1) is the farthest apex from the center of gravity of the triangle (p1p2p3), the triangle (p1p2p3) may not to be limited to the isosceles triangle as described above.

Figure 9:
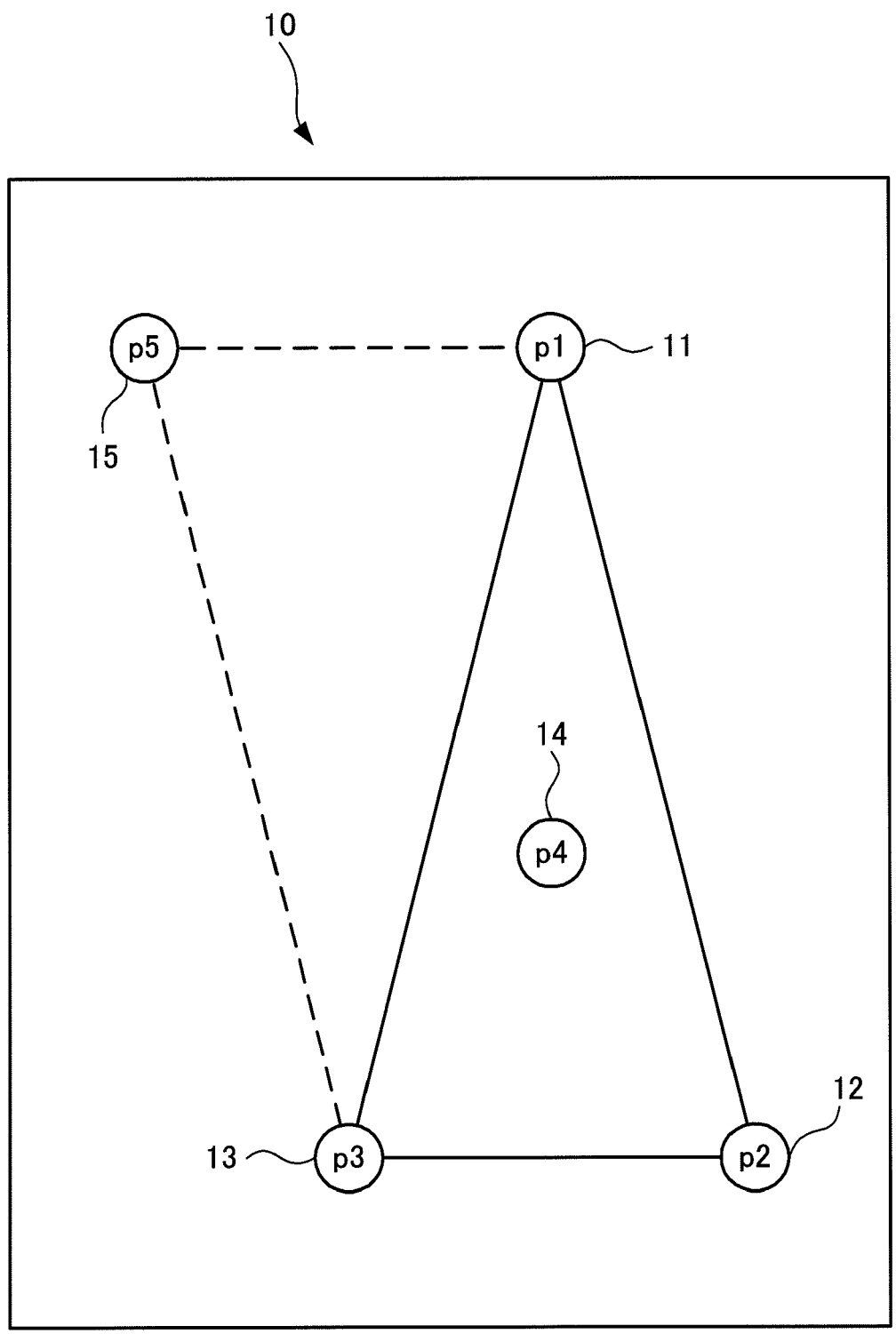
FIG. 9 is a diagram illustrating a fourth arrangement example of the reference markers and the code marker.

FIG. 9 is a diagram illustrating a fourth arrangement example of the reference markers 11 to 14 and the code marker 15.

In the fourth arrangement example, similarly to the above-described third arrangement example, the code marker 15 is arranged so that it is the farthest from the center of gravity of the triangle (p1p2p3) formed by the first reference markers 11 to 13 among all the markers. In addition, similarly to the first arrangement example, the code marker 15 is arranged so that a line segment (p3p5) connecting one of apexes (p3) of the triangle (p1p2p3) with the code marker 15 is in parallel with a side (p1p2) held between the other two apexes of the triangle.

Therefore, each marker image is identified as follows, for example. First, among five marker images, marker images corresponding to four apexes of a quadrangle having two parallel sides are extracted and identified as the marker images of the first reference markers 11 to 13 and the code marker 15. Next, the remaining single marker image is specified as the marker image of the second reference marker 14, and, based on its position, the marker images of the first reference markers 11 to 13 are specified (the second reference marker 14 is located at the closest to the position of the center of gravity of the triangle (p1p2p3)). Among four marker images extracted in the first place, those other than the first reference markers 11 to 13 are specified as the marker image of the code marker 15.

The arrangement examples of the reference markers 11 to 14 and the code marker 15 have been explained above, but the arrangement of the markers provided on the target 10 is not limited to the above examples. By use of the geometric characteristic and the like maintained before and after the affine conversion, the arrangement may be uniquely determined such that each of the marker images in the image captured by the camera 20 corresponds to any one of the reference markers 11 to 14 and the code marker 15.

The second reference marker 14 is located at a certain height from the plane including the first reference markers 11 to 13 as mentioned above. The height may be arbitrarily determined in a range that the marker image of the second reference marker 14 is able to keep the position closest to the center of gravity of the triangle formed by the marker images of the first reference markers 11 to 13 even if the target 10 is inclined with respect to the image capturing face of the camera 20. However, the second reference marker 14 should be arranged so as to be located in front of the plane including the first reference markers 11 to 13 seen from the camera 20, and the second reference marker 14 should not be located behind the plane. In the latter case, even though the inclination of the target 10 with respect to the image capturing face of the camera 20 is different, the marker image of the second reference marker 14 may be located at the same position on the image.

Figure 10:
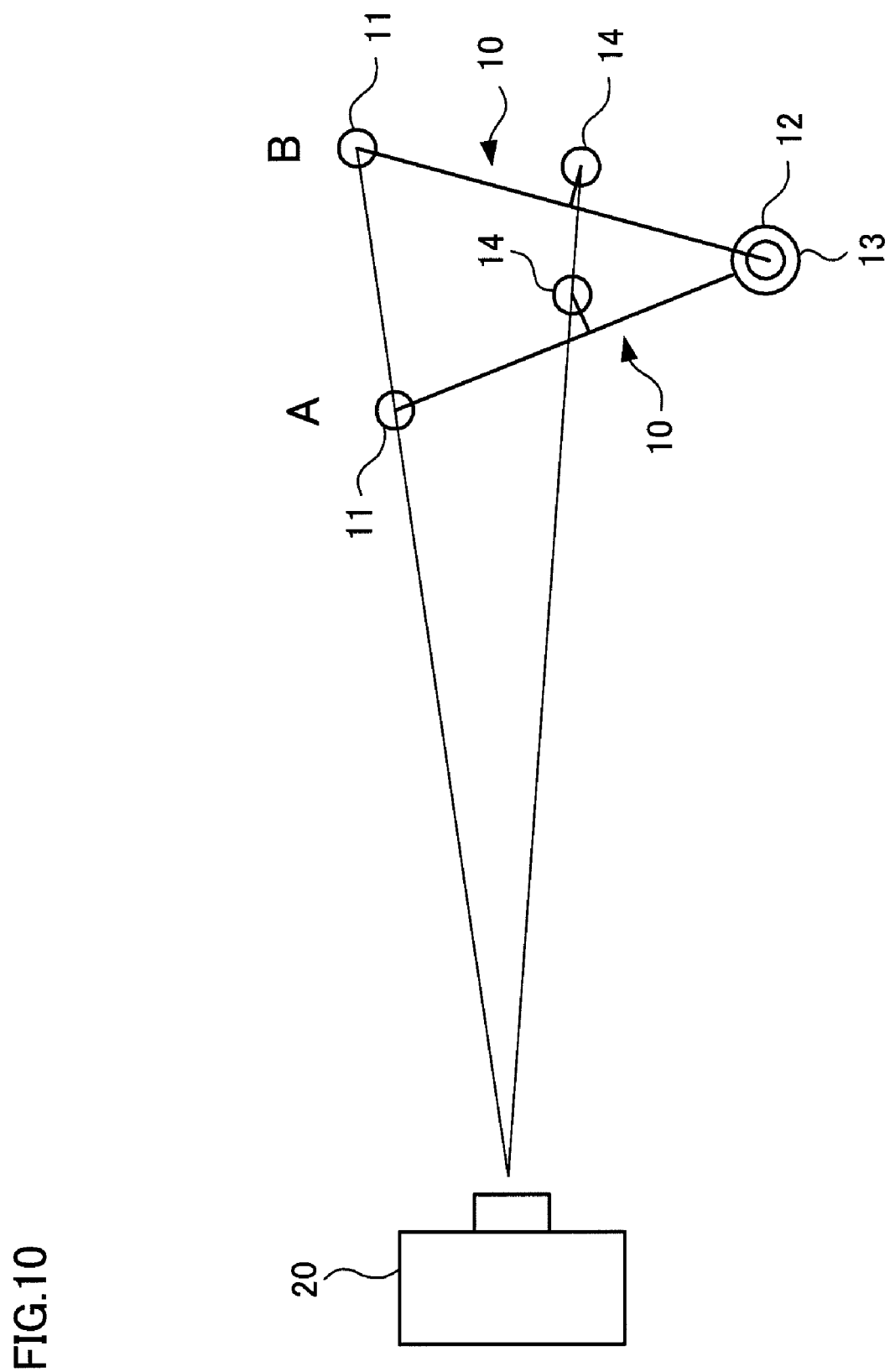
FIG. 10 is a diagram illustrating an example when the marker image of the second reference marker is captured at the same position but the inclination of the target with respect to the image capturing face of the camera is different.

FIG. 10 is a diagram illustrating an example when the marker image of the second reference marker 14 is captured at the same position but the inclination of the target 10 with respect to the image capturing face of the camera 20 is different.

In the positional relation shown in FIG. 10, whether the target 10 is in the state of A or in the state of B, the marker images of all the reference markers 11 to 14 are captured at the same position. That is, from the image captured by the camera 20, it is not identifiable whether the target 10 is in the state of A or the state of B. If the second reference marker 14 is arranged in front of the plane including the first reference markers 11 to 13, such a problem does not occur.

In the present exemplary embodiment, with regard to the target 10, while the arrangement thereof includes the reference markers 11 to 14 and the code marker 15 as described above, the shape or the like of the target 10 is not particularly limited. For example, if the reference markers 11 to 14 and the code marker 15 are arranged in an elongated region as shown in FIG. 7, the target 10 itself may be an elongated pointer or the like. In this case, a pointing direction of the pointer may be specified by the three-dimensional position and the triaxial angles of the target to be specified based on the reference markers 11 to 14.

Further, in the present exemplary embodiment, the reference markers 11 to 14 and the code marker 15 are light emitting points constituted by LEDs, but not limited to that. For example, a retroreflector may be provided instead of the LED as the reference markers 11 to 14 and the code marker 15, and light is irradiated from an illumination device provided near the camera 20 so that reflected light by the retroreflector is captured by the camera 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A position measurement system comprising:
an image capturing unit that captures first reference points which are three reference points on a plane arranged on a target and whose positional relation with each other is specified, and a second reference point which is a single reference point at a given distance away from the plane and whose positional relation with the first reference points is specified, wherein the second reference point is attached to the target;
an identifying unit that identifies images of the first reference points and an image of the second reference point on the basis of the positional relation among the images of the four reference points captured by the image capturing unit; and
a calculating unit that calculates a three-dimensional position and triaxial angles of the target on the basis of the positional relation between the images of the first reference points and the image of the second reference point identified by the identifying unit,
wherein the calculating unit specifies the plane including the first reference points on the target from the images of the first reference points identified by the identifying unit, and specifies a normal direction of the plane according to the image of the second reference point identified by the identifying unit.

2. The position measurement system according to claim 1, wherein the second reference point captured by the image capturing unit is a point at the given distance away from the plane including the first reference points to the image capturing unit.

3. The position measurement system according to claim 1, wherein
the calculating unit specifies a three-dimensional position of the first reference points on the basis of candidates of the three-dimensional position of the first reference points acquired based on the positional relation of the images of the first reference points, change in the positional relation among the images of the first reference points and the image of the second reference point based on the triaxial angles of the target, and a position of the image of the actual second reference point captured by the image capturing unit, and
the calculating unit specifies the three-dimensional position and the triaxial angles of the target on the basis of the specified three-dimensional position of the first reference points.

4. The position measurement system according to claim 1, wherein
the second reference point captured by the image capturing unit is arranged at a position close to a center of gravity of a triangle formed by the first reference points relative to the first reference points, and
the identifying unit identifies an image at a position closest to a center of gravity of a quadrangle formed by the captured images of the four reference points as the image of the second reference point and identifies other three images as the images of the first reference points.

5. The position measurement system according to claim 1, wherein
a triangle formed by the first reference points captured by the image capturing unit has a short side with length of two-third or less of length of other two sides, and
the identifying unit identifies a shortest side among the sides of the triangle formed by the images of the identified first reference points as the short side, and identifies the individual first reference points on the basis of positional relation between the specified short side and an image of one of the first reference points that is not located on the short side.

6. A position measurement system comprising:
an image capturing unit that captures first reference points which are three reference points on a plane arranged on a target and whose positional relation with each other is specified, a second reference point which is a single reference point at a given distance from the plane and whose positional relation with the first reference points is specified, and a third reference point which is arranged on the plane and whose positional relation with the first reference points is specified, wherein the second reference point is attached to the target;
an identifying unit that identifies images of the first reference points, an image of the second reference point and an image of the third reference point on the basis of positional relation among the images of the five reference points captured by the image capturing unit; and
a calculating unit that calculates a three-dimensional position and triaxial angles of the target on the basis of the positional relation between the images of the first reference points and the image of the second reference point identified by the identifying unit,
wherein the calculating unit specifies the plane including the first reference points on the target from the images of the first reference points identified by the identifying unit, and specifies a normal direction of the plane according to the image of the second reference point identified by the identifying unit.

7. The position measurement system according to claim 6, wherein
the third reference point captured by the image capturing unit is arranged so that a line segment connecting one apex of a triangle formed by the first reference points with the third reference point is in parallel with a side held between other two apexes of the triangle, the third reference point is located at a terminal end of the line segment when a quadrangle including the line segment and the side is followed clockwise, and the line segment is shorter than the side, and
the identifying unit extracts a quadrangle having parallel two sides from the captured images of the five reference points, identifies, as the image of the third reference point, the image located on a shorter side of the two sides and at the terminal end of the quadrangle when the quadrangle is followed clockwise, and identifies the other three images as the images of the first reference points.

8. A position measurement system comprising:
an image capturing unit that captures first reference points which are three reference points on a plane arranged on a target and whose positional relation with each other is specified, a second reference point which is a single reference point at a given distance from the plane and whose positional relation with the first reference points is specified, and a third reference point which is arranged on the plane and whose positional relation with the first reference points is specified;
an identifying unit that identifies images of the first reference points, an image of the second reference point and an image of the third reference point on the basis of positional relation among the images of the five reference points captured by the image capturing unit; and a calculating unit that calculates a three-dimensional position and triaxial angles of the target on the basis of the positional relation between the images of the first reference points and the image of the second reference point identified by the identifying unit, wherein:

the calculating unit specifies the plane including the first reference points on the target from the images of the first reference points identified by the identifying unit, and specifies a normal direction of the plane according to the image of the second reference point identified by the identifying unit, the second reference point captured by the image capturing unit is arranged at a position close to a center of gravity of a triangle formed by the first reference points relative to the first reference points, the third reference point captured by the image capturing unit is arranged so that a line segment connecting one apex of a triangle formed by the first reference points with the third reference point is in parallel with a side held between other two apexes of the triangle, the third reference point is located at a terminal end of the line segment when a quadrangle including the line segment and the side is followed clockwise, and the third reference point is located at a position far from the center of gravity of the triangle formed by the first reference points relative to the first reference points, and the identifying unit extracts a quadrangle having parallel two sides from the captured images of the five reference points, identifies an image not included in the quadrangle as the image of the second reference point, specifies the images of the first reference points and a position of the center of gravity of the triangle formed by the first reference points on the basis of a position of the image of the second reference point, and specifies the image of the third reference point on the basis of the position of the center of gravity.

9. A position measurement system comprising:

an image capturing unit that captures first reference points which are three reference points on a plane arranged on a target and whose positional relation with each other is specified, a second reference point which is a single reference point at a given distance from the plane and whose positional relation with the first reference points is specified, and a third reference point which is arranged on the plane and whose positional relation with the first reference points is specified;

an identifying unit that identifies images of the first reference points, an image of the second reference point and an image of the third reference point on the basis of positional relation among the images of the five reference points captured by the image capturing unit; and a calculating unit that calculates a three-dimensional position and triaxial angles of the target on the basis of the positional relation between the images of the first reference points and the image of the second reference point identified by the identifying unit, wherein:

the calculating unit specifies the plane including the first reference points on the target from the images of the first reference points identified by the identifying unit, and specifies a normal direction of the plane according to the image of the second reference point identified by the identifying unit, the second reference point captured by the image capturing unit is arranged at a position close to a center of gravity of a triangle formed by the first reference points relative to the first reference points;

the third reference point captured by the image capturing unit is arranged at a position far from the center of gravity relative to the first reference points, on a straight line connecting one of the first reference points at a position farthest from the center of gravity of the triangle formed by the first reference points with the center of gravity; and the identifying unit extracts three images aligned on a straight line from the captured images of the five reference points, identifies an image in the middle and two images not on the straight line as the images of the first reference points, identifies an image closest to the center of gravity of the triangle formed by the images of the first reference points as the image of the second reference point, and identifies an image farthest from the center of gravity as the image of the third reference point.

10. A position measurement method comprising:

using a camera to capture first reference points which are three reference points on a plane arranged on a target and whose positional relation with each other is specified, and a second reference point which is a single reference point at a given distance away from the plane and whose positional relation with the first reference points is specified, wherein the second reference point is attached to the target;

identifying images of the first reference points and an image of the second reference point on the basis of the positional relation among the images of the four reference points that are captured; and calculating a three-dimensional position and triaxial angles of the target on the basis of the positional relation between the images of the first reference points and the image of the second reference point that are identified, wherein the calculating of the three-dimensional position and the triaxial angles of the target comprises specifying the plane including the first reference points on the target from the images of the first reference points that are identified, and specifying a normal direction of the plane according to the image of the second reference point that is identified.

11. The position measurement method according to claim 10, wherein the captured second reference point is a point at a given distance away from the plane including the first reference points.

12. A computer readable medium storing a program causing a computer to execute a process for measuring a position of a target, the process comprising:

identifying images of first reference points and an image of a second reference point on the basis of positional relation among images of four reference points acquired by capturing the first reference points which are three reference points on a plane arranged on a target and whose positional relation with each other is specified, and the second reference point which is a single reference point at a given distance from the plane and whose positional relation with the first reference points is specified by an image capturing unit, wherein the second reference point is attached to the target; and calculating a three-dimensional position and triaxial angles of the target on the basis of the positional relation between the images of the first reference points and the image of the second reference point identified by an identifying unit, wherein the calculating of the three-dimensional position and the triaxial angles of the target comprises specifying the plane including the first reference points on the target from the images of the first reference points that are identified and specifying a normal direction of the plane according to the image of the second reference point that is identified.

13. A position measurement method comprising:

identifying images of first reference points and an image of a second reference point on the basis of a positional relation among the images, wherein the first reference points are three reference points on a plane arranged on a target, a positional relation of the first reference points with each other is specified, the second reference point is a single reference point at a given distance from the plane, a positional relation of the second reference point with the first reference points is specified, and the second reference point is attached to the target; and calculating, by using a processor, a three-dimensional position and triaxial angles of the target on the basis of the positional relation between the images of the first reference points and the image of the second reference point, wherein the calculating of the three-dimensional position and the triaxial angles of the target comprises specifying the plane including the first reference points on the target from the images of the first reference points that are identified and specifying a normal direction of the plane according to the image of the second reference point that are is identified.

* * * * *